United States Patent
Liu et al.

(10) Patent No.: US 11,184,118 B2
(45) Date of Patent: Nov. 23, 2021

(54) METHODS AND DEVICES FOR HYBRID AUTOMATIC REPEAT REQUEST ACKNOWLEDGEMENT/NON-ACKNOWLEDGEMENT BUNDLING

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/762,524

(22) PCT Filed: Nov. 1, 2018

(86) PCT No.: PCT/CN2018/113386
§ 371 (c)(1),
(2) Date: May 8, 2020

(87) PCT Pub. No.: WO2019/096013
PCT Pub. Date: May 23, 2019

(65) Prior Publication Data
US 2020/0274648 A1    Aug. 27, 2020

(30) Foreign Application Priority Data

Nov. 14, 2017 (WO) ................ PCT/CN2017/110922

(51) Int. Cl.
*H04L 1/18* (2006.01)
*H04L 5/00* (2006.01)
*H04W 72/04* (2009.01)

(52) U.S. Cl.
CPC .......... *H04L 1/1819* (2013.01); *H04L 1/1887* (2013.01); *H04L 5/0051* (2013.01); *H04L 5/0094* (2013.01); *H04W 72/0446* (2013.01)

(58) Field of Classification Search
CPC ....... H04L 1/18; H04L 1/1812; H04L 1/1819; H04L 1/1887; H04L 1/1893;
(Continued)

(56) References Cited

U.S. PATENT DOCUMENTS

2012/0082145 A1    4/2012  Chen et al.
2015/0341858 A1    11/2015 Hwang et al.
(Continued)

FOREIGN PATENT DOCUMENTS

CN      103338097 A       10/2013
WO   WO 2012129952 A1    10/2012
WO   WO 2016/119245 A1    8/2016

OTHER PUBLICATIONS

International Search Report and Written Opinion of the International Searching Authority, PCT/CN2018/113386, dated Jan. 30, 2019, 11 pages.
(Continued)

*Primary Examiner* — Kent Krueger
(74) *Attorney, Agent, or Firm* — Sage Patent Group

(57) ABSTRACT

A method at a terminal device capable of Hybrid Automatic Repeat reQuest, HARQ, Acknowledgement/Non-Acknowledgement, ACK/NACK, bundling is disclosed. The method includes determining that a number of HARQ ACK/NACK bits to be transmitted is larger than a predetermined capacity and bundling at least two of the number of HARQ ACK/NACK bits based on a data transmission duration associated with each of the number of HARQ ACK/NACK bits.

20 Claims, 7 Drawing Sheets

(58) Field of Classification Search
CPC .............. H04L 5/0051; H04L 5/0094; H04W 72/0446; H04W 72/0453; H04W 72/10
See application file for complete search history.

(56) References Cited

U.S. PATENT DOCUMENTS

| | | |
|---|---|---|
| 2015/0349941 A1 | 12/2015 | Papasakellariou et al. |
| 2017/0331594 A1 | 11/2017 | Wen et al. |
| 2019/0074937 A1* | 3/2019 | Bhattad ................ H04L 1/1896 |
| 2019/0074952 A1* | 3/2019 | Bhattad ................ H04L 1/1812 |
| 2019/0103947 A1* | 4/2019 | Park ...................... H04L 1/1896 |
| 2020/0177424 A1* | 6/2020 | Noh ................... H04W 72/0413 |
| 2020/0220666 A1* | 7/2020 | Xue ...................... H04L 1/1861 |
| 2020/0221444 A1* | 7/2020 | Tiirola .................. H04L 1/1812 |

OTHER PUBLICATIONS

Extended European Search Report dated Aug. 4, 2021 for European Patent Application No. 18879833.4, 9 pages.
Nokia et al., 3GPP TSG RAN WG1 Meeting 90bis, R1-1718621, "Remaining aspects of HARQ management," Prague, Czech, Oct. 9-13, 2017, 10 pages.

* cited by examiner

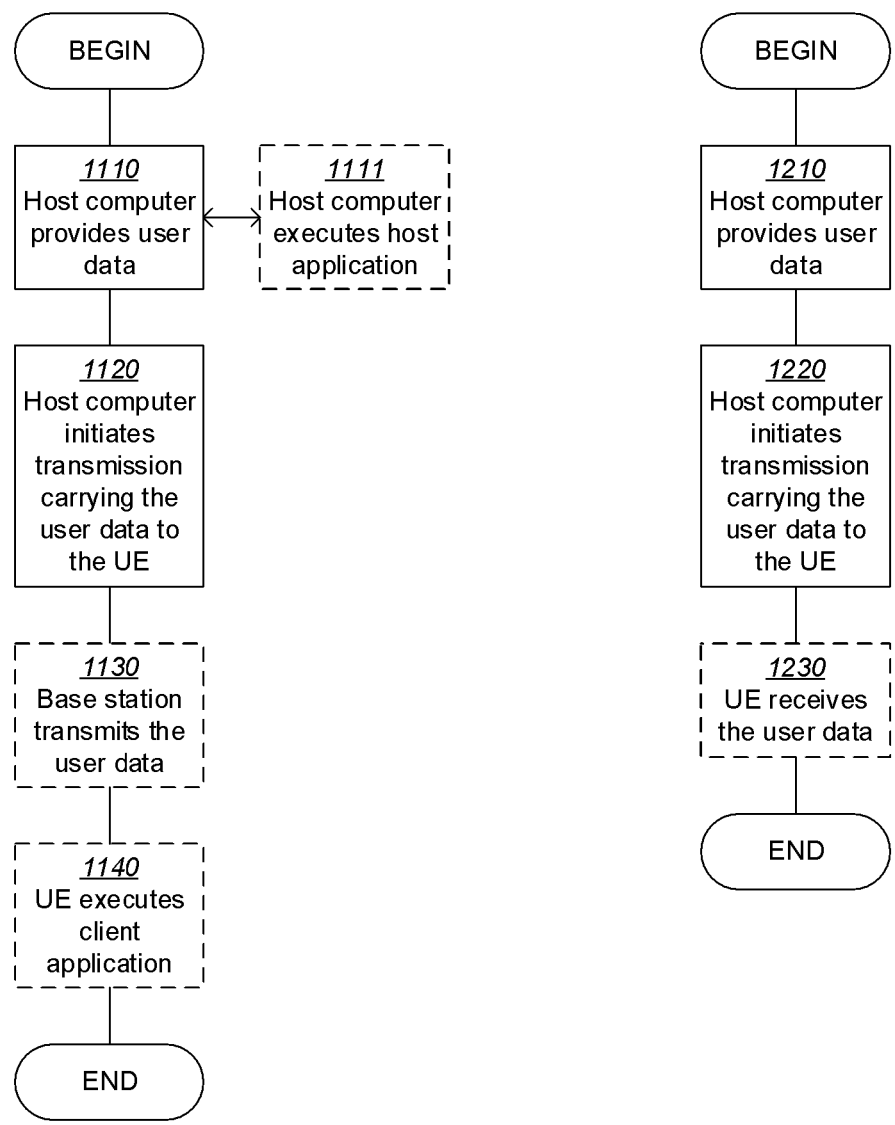

METHODS AND DEVICES FOR HYBRID AUTOMATIC REPEAT REQUEST ACKNOWLEDGEMENT/NON-ACKNOWLEDGEMENT BUNDLING

CROSS REFERENCE TO RELATED APPLICATIONS

This application is a 35 U.S.C. § 371 national stage application of PCT International Application No. PCT/CN2018/113386 filed on Nov. 1, 2018, which in turns claims foreign priority to PCT International Patent Application No. PCT/CN2017/110922, filed on Nov. 14, 2017, the disclosures and content of which are incorporated by reference herein in their entirety.

TECHNICAL FIELD

The present disclosure relates to wireless communications, and more particularly, to methods and devices for Hybrid Automatic Repeat reQuest (HARQ) Acknowledgement/Non-Acknowledgement (ACK/NACK) bundling.

BACKGROUND

In Long Term Evolution (LTE), for a Physical Downlink Shared Channel (PDSCH) transmission from a network device (e.g., an evolved NodeB (eNB)), a terminal device (e.g., User Equipment (UE)) transmits a HARQ ACK or NACK bit to the network device. When an Uplink Control Information (UCI) format does not have an enough capacity to carry all HARQ ACK/NACK bits to be transmitted, more than one HARQ ACK/NACK bits can be bundled, e.g., by combination into one bit via AND operation, until the number of resulting bits matches the capacity of the UCI format.

With the AND operation, the resulting bit is a NACK bit if any one of the HARQ ACK/NACK bits to be bundled is a NACK bit. In this case, the eNB will have to retransmit all Transport Blocks (TBs) associated with the resulting bit, which may cause performance loss as some correctly received TBs associated with the resulting bit will be retransmitted as well.

In LTE, there are two types of HARQ ACK/NACK bundling schemes:
  Spatial-domain bundling. HARQ ACK/NACK bits associated with spatially multiplexed TBs can be bundled into one bit.
  Time-domain bundling. In Time Division Duplex (TDD) operations, the HARQ ACK/NACK bits associated with multiple downlink subframes can be bundled and transmitted in one uplink subframe.

Since spatial channels towards one UE are typically highly correlated, it is likely that, when the resulting bit is a NACK bit, none of the spatially multiplexed TBs (e.g., up to two TBs for up to eight layers in LTE) has been correctly received. Hence, it is predefined that the spatial-domain bundling can be prioritized over the time-domain bundling. That is, the time-domain bundling can only be performed when the capacity of the UCI format is still not enough to carry the HARQ ACK/NACK bits after the spatial-domain bundling.

In New Radio (NR), however, the above schemes for HARQ ACK/NACK bundling may be sub-optimal and a solution adapted for new features introduced in the NR is thus desired.

SUMMARY

It is an object of the present disclosure to provide methods and devices for HARQ ACK/NACK bundling, capable of mitigating performance loss due to HARQ ACK/NACK bundling, particularly in the NR.

According to a first aspect of the present disclosure, a method in a terminal device for HARQ ACK/NACK bundling is provided. The method includes: determining that a number of HARQ ACK/NACK bits to be transmitted is larger than a predetermined capacity; and bundling at least two of the number of HARQ ACK/NACK bits based on a data transmission duration associated with each of the number of HARQ ACK/NACK bits.

In an embodiment, the operation of bundling includes: assigning, to each of the number of HARQ ACK/NACK bits, a priority based on the data transmission duration associated with that HARQ ACK/NACK bit; and bundling at least two of the number of HARQ ACK/NACK bits in accordance with the priorities.

In an embodiment, the operation of assigning includes: assigning a higher priority to a first HARQ ACK/NACK bit than to a second HARQ ACK/NACK bit. The first HARQ ACK/NACK bit is associated with a shorter data transmission duration than the second HARQ ACK/NACK bit. The operation of bundling includes: bundling at least two of the number of HARQ ACK/NACK bits that have the highest priorities.

In an embodiment, the first HARQ ACK/NACK bit is associated with a data transmission in a first numerology having a first Sub-Carrier Spacing (SCS), and the second HARQ ACK/NACK bit is associated with a data transmission in a second numerology having a second SCS smaller than the first SCS.

In an embodiment, the first HARQ ACK/NACK bit is associated with a data transmission in a first slot duration and the second HARQ ACK/NACK bit is associated with a data transmission in a second slot duration longer than the first slot duration.

In an embodiment, the first slot duration is a duration of a mini-slot and the second slot duration is a duration of a slot.

In an embodiment, the operation of bundling further includes: determining that a number of the bundled HARQ ACK/NACK bits has reached a predetermined threshold; and assigning, to each bit resulted from the bundling, a lower priority than the priorities of the bundled HARQ ACK/NACK bits before further bundling.

In an embodiment, the bundling includes time-domain bundling and/or spatial-domain bundling.

In an embodiment, the time-domain bundling is performed only when the number of HARQ ACK/NACK bits to be transmitted is still larger than the predetermined capacity after the spatial-domain bundling.

In an embodiment, the data transmission duration is a duration of Physical Downlink Shared Channel (PDSCH) transmission.

According to a second aspect of the present disclosure, a terminal device is provided. The terminal device includes a transceiver, a processor and a memory. The memory includes instructions executable by the processor whereby the terminal device is operative to perform the method according to the above first aspect.

According to a third aspect of the present disclosure, a computer readable storage medium is provided. The computer readable storage medium has computer program instructions stored thereon. The computer program instructions, when executed by a processor in a terminal device, cause the terminal device to perform the method according to the above first aspect.

According to a fourth aspect of the present disclosure, a method in a network device for HARQ ACK/NACK bundling is provided. The method includes: receiving one or more HARQ ACK/NACK bits from a terminal device; determining, when a number of HARQ ACK/NACK bits to be received from the terminal device is larger than a predetermined capacity, that at least one of the one or more HARQ ACK/NACK bits is generated by bundling at least two HARQ ACK/NACK bits in accordance with a bundling circumstance dependent on a data transmission duration associated with each of the at least two HARQ ACK/NACK bits; and parsing the one or more HARQ ACK/NACK bits in accordance with the bundling circumstance.

In an embodiment, the bundling circumstance is such that: a priority is assigned to each of the number of HARQ ACK/NACK bits based on the data transmission duration associated with that HARQ ACK/NACK bit; and at least two of the number of HARQ ACK/NACK bits are bundled in accordance with the priorities.

In an embodiment, the bundling circumstance is such that: a higher priority is assigned to a first HARQ ACK/NACK bit than to a second HARQ ACK/NACK bit. The first HARQ ACK/NACK bit is associated with a shorter data transmission duration than the second HARQ ACK/NACK bit. Further, the bundling circumstance is such that: at least two of the number of HARQ ACK/NACK bits that have the highest priorities are bundled.

In an embodiment, the first HARQ ACK/NACK bit is associated with a data transmission in a first numerology having a first Sub-Carrier Spacing (SCS) and the second HARQ ACK/NACK bit is associated with a data transmission in a second numerology having a second SCS smaller than the first SCS.

In an embodiment, the first HARQ ACK/NACK bit is associated with a data transmission in a first slot duration and the second HARQ ACK/NACK bit is associated with a data transmission in a second slot duration longer than the first slot duration.

In an embodiment, the first slot duration is a duration of a mini-slot and the second slot duration is a duration of a slot.

In an embodiment, the bundling circumstance is such that: when a number of the bundled HARQ ACK/NACK bits has reached a predetermined threshold, a lower priority than the priorities of the bundled HARQ ACK/NACK bits is assigned to each bit resulted from the bundling, before further bundling.

In an embodiment, the bundling includes time-domain bundling and/or spatial-domain bundling.

In an embodiment, the bundling circumstance is such that the time-domain bundling is performed only when the number of HARQ ACK/NACK bits to be transmitted is larger than the predetermined capacity after the spatial-domain bundling.

In an embodiment, the data transmission duration is a duration of Physical Downlink Shared Channel (PDSCH) transmission.

According to a fifth aspect of the present disclosure, a network device is provided. The network device includes a transceiver, a processor and a memory. The memory includes instructions executable by the processor whereby the network device is operative to perform the method according to the above fourth aspect.

According to a sixth aspect of the present disclosure, a computer readable storage medium is provided. The computer readable storage medium has computer program instructions stored thereon. The computer program instructions, when executed by a processor in a network device, cause the network device to perform the method according to the above fourth aspect.

With the embodiments of the present disclosure, when the number of HARQ ACK/NACK bits to be transmitted is larger than a predetermined capacity, at least two of the HARQ ACK/NACK bits can be bundled based on a data transmission duration associated with each of the HARQ ACK/NACK bits. For example, HARQ ACK/NACK bits associated with the shortest data transmission duration can be bundled first, i.e., with the highest priority. In this way, bundling of HARQ ACK/NACK bits associated with long data transmission durations, which would otherwise cause great performance loss, can be avoided as much as possible.

BRIEF DESCRIPTION OF THE DRAWINGS

The above and other objects, features and advantages will be more apparent from the following description of embodiments with reference to the figures, in which:

FIGS. 11 to 12 are flowcharts illustrating methods implemented in a communication system including a host computer, a base station and a user equipment.

DETAILED DESCRIPTION

Figure 1:
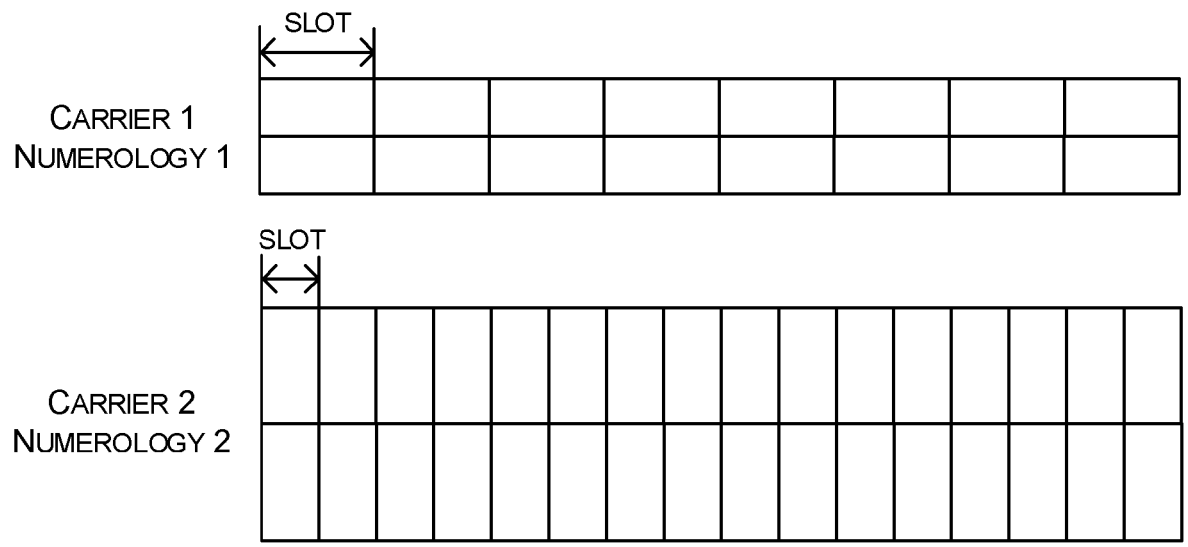
FIG. 1 is a schematic diagram showing two carriers having different numerologies.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

In time domain, NR can support a number of numerologies with different Orthogonal Frequency Division Multiplexing (OFDM) symbol lengths, and can support mini-slots (e.g. each including 2, 4 or 7 OFDM symbols) and slots (e.g., each including 14 OFDM symbols).

FIG. 1 is a schematic diagram showing two carriers, Carrier 1 and Carrier 2, having different numerologies, Numerology 1 and Numerology 2, respectively, and thus different slot durations. As shown, Carrier 1 or Numerology 1 has a smaller Sub-Carrier Spacing (SCS) and a longer slot duration than Carrier 2 or Numerology 2.

Figure 2:
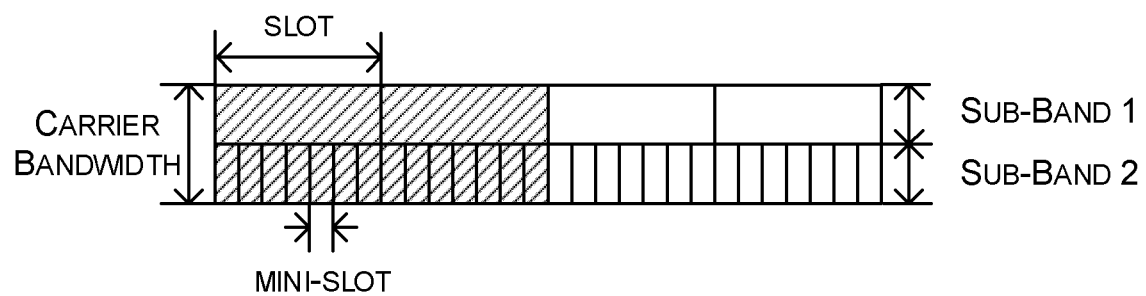
FIG. 2 is a schematic diagram showing one carrier having two sub-bands with different slot durations.

FIG. 2 is a schematic diagram showing one carrier having two sub-bands with different slot durations. As shown, a carrier bandwidth contains two sub-bands (or Band-Width Parts (BWPs)), Sub-band 1 and Sub-band 2. Sub-band 1 is configured with slots each containing e.g., 14 OFDM symbols and Sub-band 2 is configured with mini-slots each containing e.g., 2 OFDM symbols.

In FIGS. 1 and 2, a data transmission, e.g., a Physical Downlink Shared Channel (PDSCH) transmission may occur in one slot or mini-slot and a HARQ ACK/NACK bit can be provided for each data transmission (i.e., each slot or mini-slot).

The inventors have realized that channel variation will be larger in a longer data transmission duration and thus the performance loss due to HARQ ACK/NACK bundling can be mitigated if data transmission durations associated with the HARQ ACK/NACK bits to be bundled can be considered.

Figure 3:
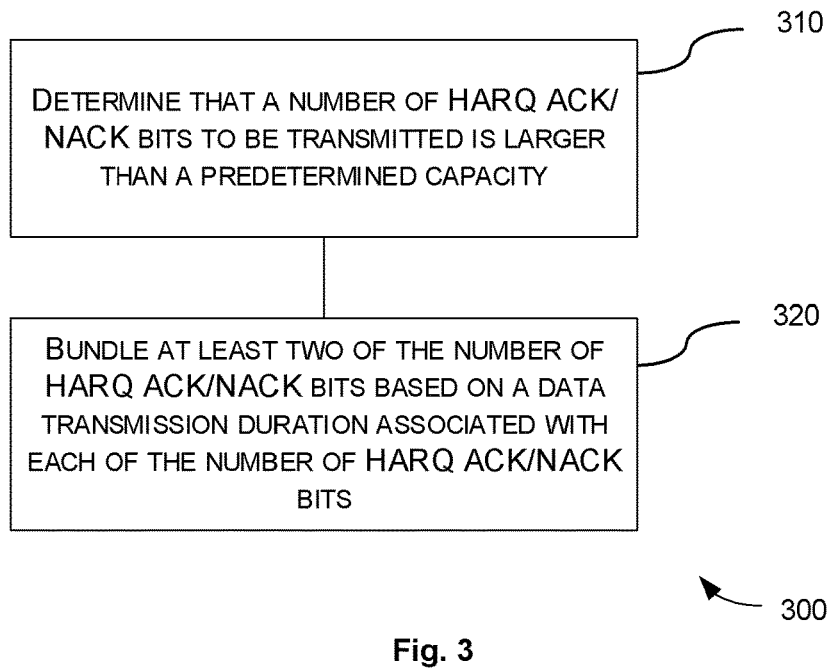
FIG. 3 is a flowchart illustrating a method in a terminal device for HARQ ACK/NACK bundling according to an embodiment of the present disclosure.

FIG. 3 is a flowchart illustrating a method 300 for HARQ ACK/NACK bundling according to an embodiment of the present disclosure. The method 300 can be performed at a terminal device.

At block 310, it is determined that a number of HARQ ACK/NACK bits to be transmitted is larger than a predetermined capacity, e.g., a capacity of a UCI format as described above.

At block 320, at least two of the number of HARQ ACK/NACK bits are bundled based on a data transmission duration associated with each of the number of HARQ ACK/NACK bits. In other words, the at least two HARQ ACK/NACK bits are bundled in accordance with a bundling circumstance dependent on the data transmission duration associated with each of the number of HARQ ACK/NACK bits. Here, the data transmission duration can be a duration of PDSCH transmission. The bundling operation, or bundling circumstance, will be explained in detail in the following.

In the block 320, for example, a priority can be assigned to each of the number of HARQ ACK/NACK bits based on the data transmission duration associated with that HARQ ACK/NACK bit. Then, at least two of the number of HARQ ACK/NACK bits can be bundled in accordance with the priorities. That is, HARQ ACK/NACK bits having high priorities will be bundled first and HARQ ACK/NACK bits having low priorities will be bundled only when the number of HARQ ACK/NACK bits to be transmitted is still larger than the predetermined capacity after the HARQ ACK/NACK bits having high priorities have been bundled.

Particularly, a higher priority can be assigned to a first HARQ ACK/NACK bit than to a second HARQ ACK/NACK bit. The first HARQ ACK/NACK bit can be associated with a shorter data transmission duration than the second HARQ ACK/NACK bit.

In an example, the first HARQ ACK/NACK bit can be associated with a data transmission in a first numerology having a first SCS and the second HARQ ACK/NACK bit is associated with a data transmission in a second numerology having a second SCS smaller than the first SCS. For instance, in a carrier aggregation scenario where the terminal device is configured with two carriers, Carrier 1 and Carrier 2, as shown in FIG. 1, Numerology 1 has a smaller SCS than Numerology 2. Accordingly, a HARQ ACK/NACK bit associated with a data transmission in Numerology 2 can be assigned with a higher priority than a HARQ ACK/NACK bit associated with a data transmission in Numerology 1.

In another example, the first HARQ ACK/NACK bit can be associated with a data transmission in a first slot duration and the second HARQ ACK/NACK bit can be associated with a data transmission in a second slot duration longer (i.e., containing more OFDM symbols) than the first slot duration. The first slot duration can be a duration of a mini-slot and the second slot duration can be a duration of a slot. For instance, when the terminal device is configured with a carrier containing two sub-bands, Sub-band 1 and Sub-band 2, as shown in FIG. 2, a HARQ ACK/NACK bit associated with a data transmission in a mini-slot can be assigned with a higher priority than a HARQ ACK/NACK bit associated with a data transmission in a slot.

In the block 320, when it is determined that a number of the bundled HARQ ACK/NACK bits has reached a predetermined threshold, a lower priority than the priorities of the bundled HARQ ACK/NACK bits is assigned to each bit resulted from the bundling, before further bundling. For instance, in the example shown in FIG. 2, it is assumed that 16 HARQ ACK/NACK bits associated with data transmissions in the hatched slots/mini-slots are to be transmitted, the predetermined capacity for transmission of HARQ ACK/NACK bits is denoted as C, and the predetermined threshold is TH=7. As discussed above, the HARQ ACK/NACK bits associated with data transmissions in mini-slots (Sub-band 2) are assigned with higher priorities and will thus be bundled first. In this case, up to 7 HARQ ACK/NACK bits associated with data transmissions in mini-slots (Sub-band 2) can be bundled into one bit first, resulting in 2 bits, plus 2 HARQ ACK/NACK bits associated with data transmissions in slots (Sub-band 1). When C=4, no further bundling is needed. However, when C=3 for example, further bundling is needed. In this case, before further bundling, the two bits resulted from bundling are assigned with priorities lower than those of the 14 bundled bits. For example, the two bits resulted from bundling are assigned with priorities lower than or equal to those of the two bits associated with data transmissions in slots (Sub-band 1). Accordingly, the two bits associated with data transmissions in slots (Sub-band 1) can then be bundled into one bit, resulting in 3 bits in total, which matches the predetermined capacity of C=3 and no further bundling is required.

The above bundling may include time-domain bundling and/or spatial-domain bundling (e.g., when spatial multiplexing of data transmissions is applied). When the spatial-domain bundling is applied, it can be prioritized over the time-domain bundling. In other words, the time-domain bundling can be performed only when the number of HARQ ACK/NACK bits to be transmitted is still larger than the predetermined capacity after the spatial-domain bundling.

Figure 4:
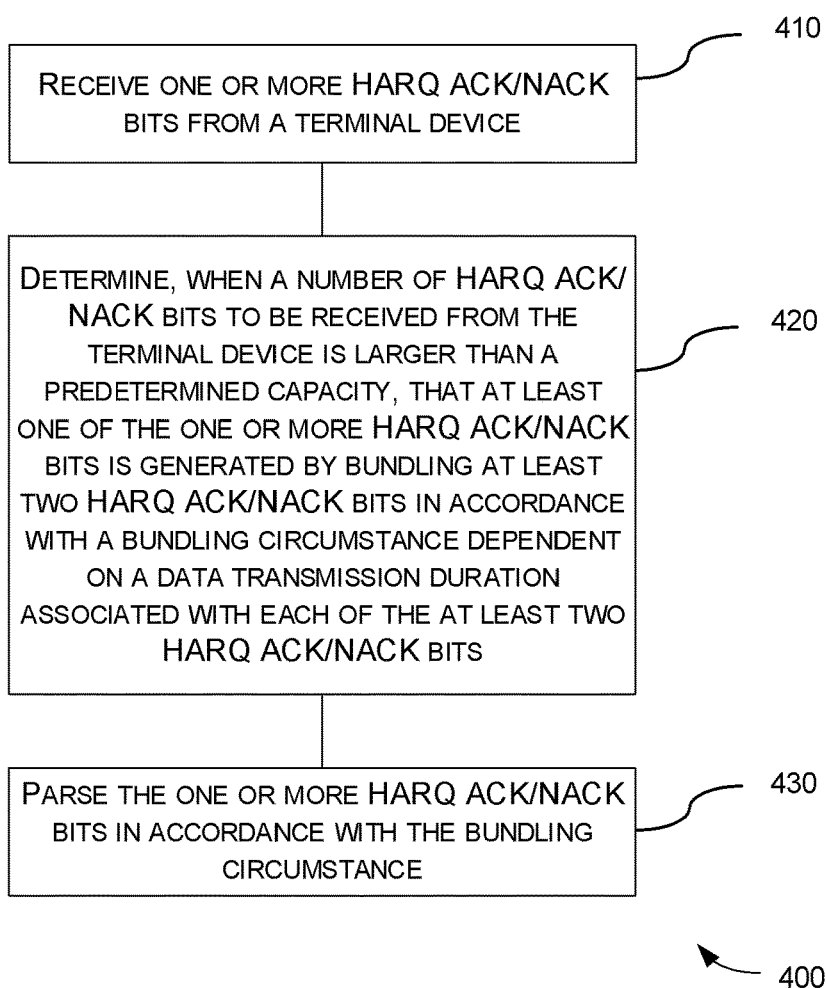
FIG. 4 is a flowchart illustrating a method in a network device for HARQ ACK/NACK bundling according to an embodiment of the present disclosure.

FIG. 4 is a flowchart illustrating a method 400 for HARQ ACK/NACK bundling according to an embodiment of the present disclosure. The method 400 can be performed at a network device.

At block 410, one or more HARQ ACK/NACK bits are received from a terminal device.

At block 420, when a number of HARQ ACK/NACK bits to be received from the terminal device is larger than a predetermined capacity, it is determined that at least one of the one or more HARQ ACK/NACK bits is generated by bundling at least two HARQ ACK/NACK bits in accordance with a bundling circumstance dependent on a data transmission duration associated with each of the at least two HARQ ACK/NACK bits.

Here, the at least one HARQ ACK/NACK bit can be generated by bundling operation, or bundling circumstance, at the terminal device as described above in connection with the method 300.

In particular, the bundling circumstance can be such that: a priority is assigned to each of the number of HARQ ACK/NACK bits based on the data transmission duration associated with that HARQ ACK/NACK bit; and at least two of the number of HARQ ACK/NACK bits are bundled in accordance with the priorities.

In an example, the bundling circumstance can be such that: a higher priority is assigned to a first HARQ ACK/NACK bit than to a second HARQ ACK/NACK bit. The first HARQ ACK/NACK bit can be associated with a shorter data transmission duration than the second HARQ ACK/NACK bit. Further, the bundling circumstance can be such that: at least two of the number of HARQ ACK/NACK bits that have the highest priorities are bundled.

In an example, the first HARQ ACK/NACK bit can be associated with a data transmission in a first numerology having a first Sub-Carrier Spacing (SCS) and the second HARQ ACK/NACK bit can be associated with a data transmission in a second numerology having a second SCS smaller than the first SCS.

In an example, the first HARQ ACK/NACK bit can be associated with a data transmission in a first slot duration and the second HARQ ACK/NACK bit can be associated with a data transmission in a second slot duration longer than the first slot duration.

In an example, the first slot duration can be a duration of a mini-slot and the second slot duration can be a duration of a slot.

In an example, the bundling circumstance can be such that: when a number of the bundled HARQ ACK/NACK bits has reached a predetermined threshold, a lower priority than the priorities of the bundled HARQ ACK/NACK bits is assigned to each bit resulted from the bundling, before further bundling.

In an example, the bundling can include time-domain bundling and/or spatial-domain bundling.

In an example, the bundling circumstance can be such that the time-domain bundling is performed only when the number of HARQ ACK/NACK bits to be transmitted is larger than the predetermined capacity after the spatial-domain bundling.

In an embodiment, the data transmission duration is a duration of Physical Downlink Shared Channel (PDSCH) transmission.

For further details of the bundling operation or bundling circumstance, reference can be made to the above description in connection with the method 300.

At block 430, the one or more HARQ ACK/NACK bits are parsed in accordance with the bundling circumstance. In particular, the network device can derive from the bundling circumstance which of the received HARQ ACK/NACK bits is/are generated by bundling at the terminal device and, for each bit that is generated by bundling, which data transmissions it is associated with.

Figure 5:
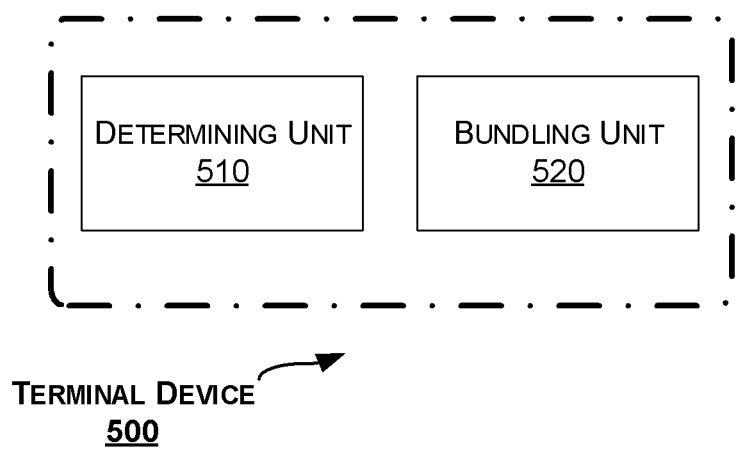
FIG. 5 is a block diagram of a terminal device according to an embodiment of the present disclosure.

Correspondingly to the method 300 as described above, a terminal device is provided. FIG. 5 is a block diagram of a terminal device 500 according to an embodiment of the present disclosure.

As shown in FIG. 5, the terminal device 500 includes a determining unit 510 configured to determine that a number of HARQ ACK/NACK bits to be transmitted is larger than a predetermined capacity. The terminal device 500 further includes a bundling unit 520 configured to bundle at least two of the number of HARQ ACK/NACK bits based on a data transmission duration associated with each of the number of HARQ ACK/NACK bits.

In an embodiment, the bundling unit 520 can be configured to: assign, to each of the number of HARQ ACK/NACK bits, a priority based on the data transmission duration associated with that HARQ ACK/NACK bit; and bundle at least two of the number of HARQ ACK/NACK bits in accordance with the priorities.

In an embodiment, the bundling unit 520 can be configured to: assign a higher priority to a first HARQ ACK/NACK bit than to a second HARQ ACK/NACK bit. The first HARQ ACK/NACK bit is associated with a shorter data transmission duration than the second HARQ ACK/NACK bit. The bundling unit 520 can be further configured to: bundle at least two of the number of HARQ ACK/NACK bits that have the highest priorities.

In an embodiment, the first HARQ ACK/NACK bit can be associated with a data transmission in a first numerology having a first Sub-Carrier Spacing (SCS), and the second HARQ ACK/NACK bit can be associated with a data transmission in a second numerology having a second SCS smaller than the first SCS.

In an embodiment, the first HARQ ACK/NACK bit can be associated with a data transmission in a first slot duration and the second HARQ ACK/NACK bit can be associated with a data transmission in a second slot duration longer than the first slot duration.

In an embodiment, the first slot duration can be a duration of a mini-slot and the second slot duration can be a duration of a slot.

In an embodiment, the bundling unit 520 can be further configured to: determine that a number of the bundled HARQ ACK/NACK bits has reached a predetermined threshold; and assign, to each bit resulted from the bundling, a lower priority than the priorities of the bundled HARQ ACK/NACK bits before further bundling.

In an embodiment, the bundling can include time-domain bundling and/or spatial-domain bundling.

In an embodiment, the time-domain bundling can be performed only when the number of HARQ ACK/NACK bits to be transmitted is still larger than the predetermined capacity after the spatial-domain bundling.

In an embodiment, the data transmission duration can be a duration of Physical Downlink Shared Channel (PDSCH) transmission.

The determining unit 510 and the bundling unit 520 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 3.

Figure 6:
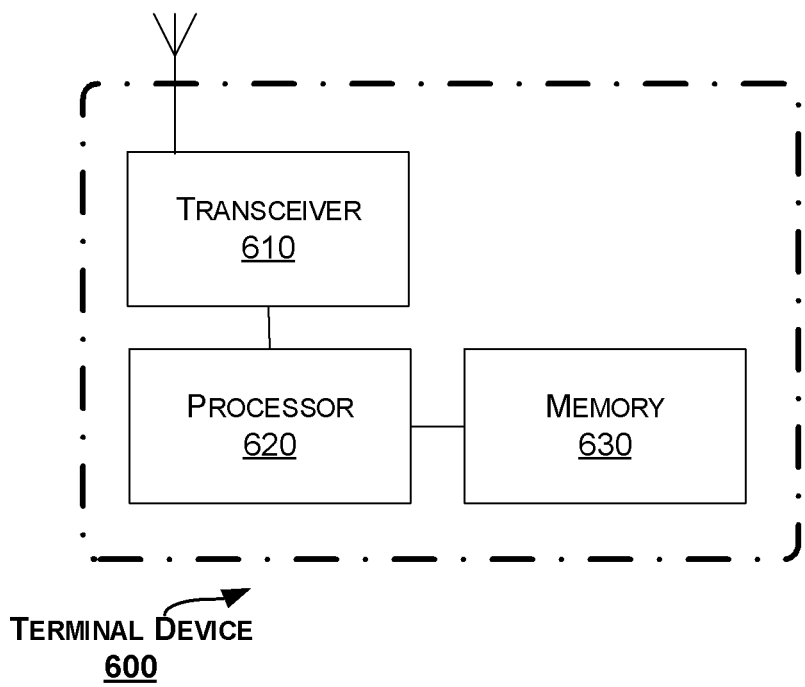
FIG. 6 is a block diagram of a terminal device according to another embodiment of the present disclosure.

FIG. 6 is a block diagram of a terminal device 600 according to another embodiment of the present disclosure.

The terminal device 600 includes a transceiver 610, a processor 620 and a memory 630. The memory 630 contains instructions executable by the processor 620 whereby the terminal device 600 is operative to perform the actions, e.g., of the procedure described earlier in conjunction with FIG. 3. Particularly, the memory 630 contains instructions executable by the processor 620 whereby the terminal device 600 is operative to: determine that a number of HARQ ACK/NACK bits to be transmitted is larger than a predetermined capacity; and bundle at least two of the number of HARQ ACK/NACK bits based on a data transmission duration associated with each of the number of HARQ ACK/NACK bits.

In an embodiment, the operation of bundling can include: assigning, to each of the number of HARQ ACK/NACK bits, a priority based on the data transmission duration associated with that HARQ ACK/NACK bit; and bundling at least two of the number of HARQ ACK/NACK bits in accordance with the priorities.

In an embodiment, the operation of assigning can include: assigning a higher priority to a first HARQ ACK/NACK bit than to a second HARQ ACK/NACK bit. The first HARQ ACK/NACK bit is associated with a shorter data transmission duration than the second HARQ ACK/NACK bit. The operation of bundling includes: bundling at least two of the number of HARQ ACK/NACK bits that have the highest priorities.

In an embodiment, the first HARQ ACK/NACK bit can be associated with a data transmission in a first numerology having a first Sub-Carrier Spacing (SCS), and the second HARQ ACK/NACK bit can be associated with a data transmission in a second numerology having a second SCS smaller than the first SCS.

In an embodiment, the first HARQ ACK/NACK bit can be associated with a data transmission in a first slot duration and the second HARQ ACK/NACK bit can be associated with a data transmission in a second slot duration longer than the first slot duration.

In an embodiment, the first slot duration can be a duration of a mini-slot and the second slot duration can be a duration of a slot.

In an embodiment, the operation of bundling can further include: determining that a number of the bundled HARQ ACK/NACK bits has reached a predetermined threshold; and assigning, to each bit resulted from the bundling, a lower priority than the priorities of the bundled HARQ ACK/NACK bits before further bundling.

In an embodiment, the bundling can include time-domain bundling and/or spatial-domain bundling.

In an embodiment, the time-domain bundling can be performed only when the number of HARQ ACK/NACK bits to be transmitted is still larger than the predetermined capacity after the spatial-domain bundling.

In an embodiment, the data transmission duration can be a duration of Physical Downlink Shared Channel (PDSCH) transmission.

Figure 7:
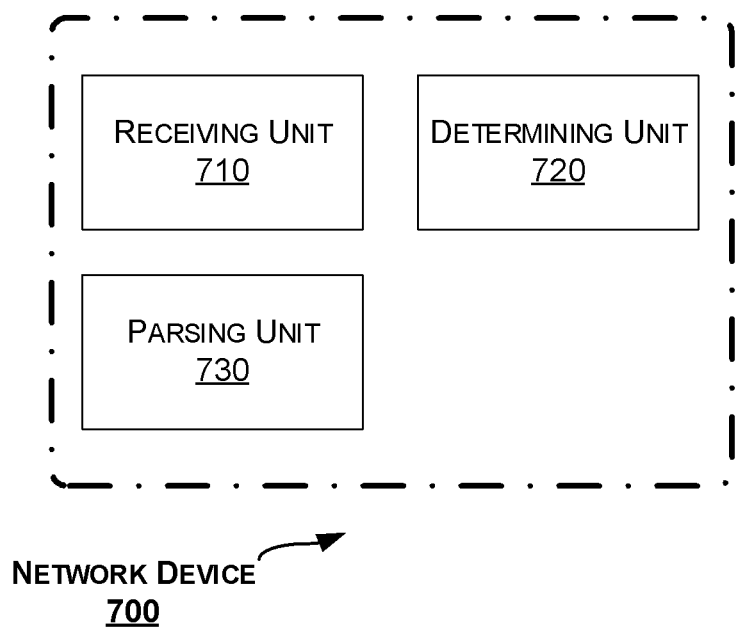
FIG. 7 is a block diagram of a network device according to an embodiment of the present disclosure.

Correspondingly to the method 400 as described above, a network device is provided. FIG. 7 is a block diagram of a network device 700 according to an embodiment of the present disclosure.

As shown in FIG. 7, the network device 700 includes a receiving unit 710 configured to receive one or more HARQ ACK/NACK bits from a terminal device. The network device 700 further includes a determining unit 720 configured to determine, when a number of HARQ ACK/NACK bits to be received from the terminal device is larger than a predetermined capacity, that at least one of the one or more HARQ ACK/NACK bits is generated by bundling at least two HARQ ACK/NACK bits in accordance with a bundling circumstance dependent on a data transmission duration associated with each of the at least two HARQ ACK/NACK bits. The network device 700 further includes a parsing unit 720 configured to parse the one or more HARQ ACK/NACK bits in accordance with the bundling circumstance.

In an embodiment, the bundling circumstance can be such that: a priority is assigned to each of the number of HARQ ACK/NACK bits based on the data transmission duration associated with that HARQ ACK/NACK bit; and at least two of the number of HARQ ACK/NACK bits are bundled in accordance with the priorities.

In an embodiment, the bundling circumstance can be such that: a higher priority is assigned to a first HARQ ACK/NACK bit than to a second HARQ ACK/NACK bit. The first HARQ ACK/NACK bit is associated with a shorter data transmission duration than the second HARQ ACK/NACK bit. Further, the bundling circumstance is such that: at least two of the number of HARQ ACK/NACK bits that have the highest priorities are bundled.

In an embodiment, the first HARQ ACK/NACK bit can be associated with a data transmission in a first numerology having a first Sub-Carrier Spacing (SCS) and the second HARQ ACK/NACK bit can be associated with a data transmission in a second numerology having a second SCS smaller than the first SCS.

In an embodiment, the first HARQ ACK/NACK bit can be associated with a data transmission in a first slot duration and the second HARQ ACK/NACK bit can be associated with a data transmission in a second slot duration longer than the first slot duration.

In an embodiment, the first slot duration can be a duration of a mini-slot and the second slot duration can be a duration of a slot.

In an embodiment, the bundling circumstance can be such that: when a number of the bundled HARQ ACK/NACK bits has reached a predetermined threshold, a lower priority than the priorities of the bundled HARQ ACK/NACK bits is assigned to each bit resulted from the bundling, before further bundling.

In an embodiment, the bundling can include time-domain bundling and/or spatial-domain bundling.

In an embodiment, the bundling circumstance can be such that the time-domain bundling is performed only when the number of HARQ ACK/NACK bits to be transmitted is larger than the predetermined capacity after the spatial-domain bundling.

In an embodiment, the data transmission duration can be a duration of Physical Downlink Shared Channel (PDSCH) transmission.

The receiving unit 710, the determining unit 720 and the parsing unit 730 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 4.

Figure 8:
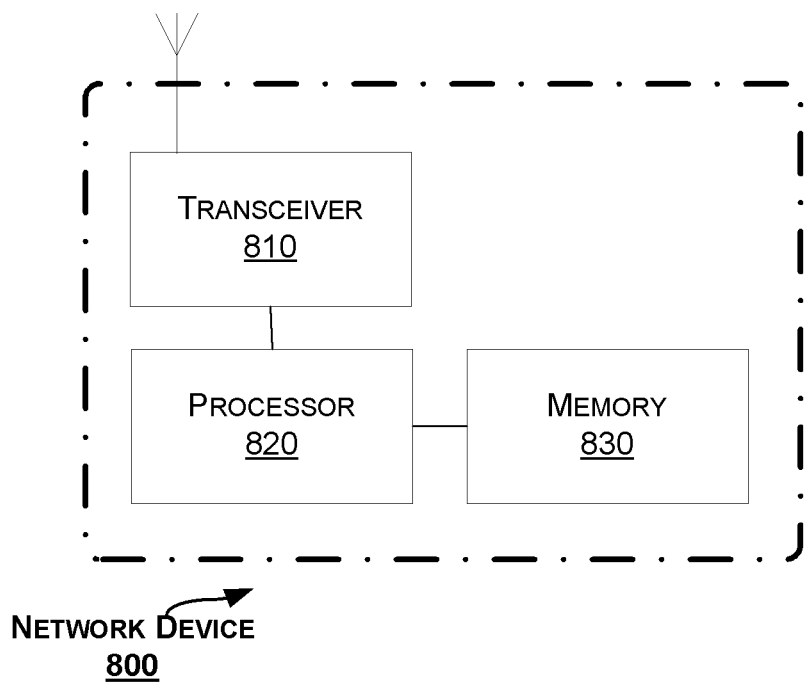
FIG. 8 is a block diagram of a network device according to another embodiment of the present disclosure.

FIG. 8 is a block diagram of a network device 800 according to another embodiment of the present disclosure.

The network device 800 includes a transceiver 810, a processor 820 and a memory 830. The memory 830 contains instructions executable by the processor 820 whereby the network device 800 is operative to perform the actions, e.g., of the procedure described earlier in conjunction with FIG. 4. Particularly, the memory 830 contains instructions executable by the processor 820 whereby the network device 800 is operative to: receive one or more HARQ ACK/NACK bits from a terminal device; determine, when a number of HARQ ACK/NACK bits to be received from the terminal device is larger than a predetermined capacity, that at least one of the one or more HARQ ACK/NACK bits is generated by bundling at least two HARQ ACK/NACK bits in accordance with a bundling circumstance dependent on a data transmission duration associated with each of the at least two HARQ ACK/NACK bits; and parse the one or more HARQ ACK/NACK bits in accordance with the bundling circumstance.

In an embodiment, the bundling circumstance can be such that: a priority is assigned to each of the number of HARQ ACK/NACK bits based on the data transmission duration associated with that HARQ ACK/NACK bit; and at least two of the number of HARQ ACK/NACK bits are bundled in accordance with the priorities.

In an embodiment, the bundling circumstance can be such that: a higher priority is assigned to a first HARQ ACK/NACK bit than to a second HARQ ACK/NACK bit. The first HARQ ACK/NACK bit is associated with a shorter data transmission duration than the second HARQ ACK/NACK bit. Further, the bundling circumstance is such that: at least two of the number of HARQ ACK/NACK bits that have the highest priorities are bundled.

In an embodiment, the first HARQ ACK/NACK bit can be associated with a data transmission in a first numerology having a first Sub-Carrier Spacing (SCS) and the second HARQ ACK/NACK bit can be associated with a data transmission in a second numerology having a second SCS smaller than the first SCS.

In an embodiment, the first HARQ ACK/NACK bit can be associated with a data transmission in a first slot duration and the second HARQ ACK/NACK bit can be associated with a data transmission in a second slot duration longer than the first slot duration.

In an embodiment, the first slot duration can be a duration of a mini-slot and the second slot duration can be a duration of a slot.

In an embodiment, the bundling circumstance can be such that: when a number of the bundled HARQ ACK/NACK bits has reached a predetermined threshold, a lower priority than the priorities of the bundled HARQ ACK/NACK bits is assigned to each bit resulted from the bundling, before further bundling.

In an embodiment, the bundling can include time-domain bundling and/or spatial-domain bundling.

In an embodiment, the bundling circumstance can be such that the time-domain bundling is performed only when the number of HARQ ACK/NACK bits to be transmitted is larger than the predetermined capacity after the spatial-domain bundling.

In an embodiment, the data transmission duration can be a duration of Physical Downlink Shared Channel (PDSCH) transmission.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 620 causes the terminal device 600 to perform the actions, e.g., of the procedure described earlier in conjunction with FIG. 3; or code/computer readable instructions, which when executed by the processor 820 causes the network device 800 to perform the actions, e.g., of the procedure described earlier in conjunction with FIG. 4.

The computer program product may be configured as a computer program code structured in computer program modules. The computer program modules could essentially perform the actions of the flow illustrated in FIG. 3 or 4.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 9:
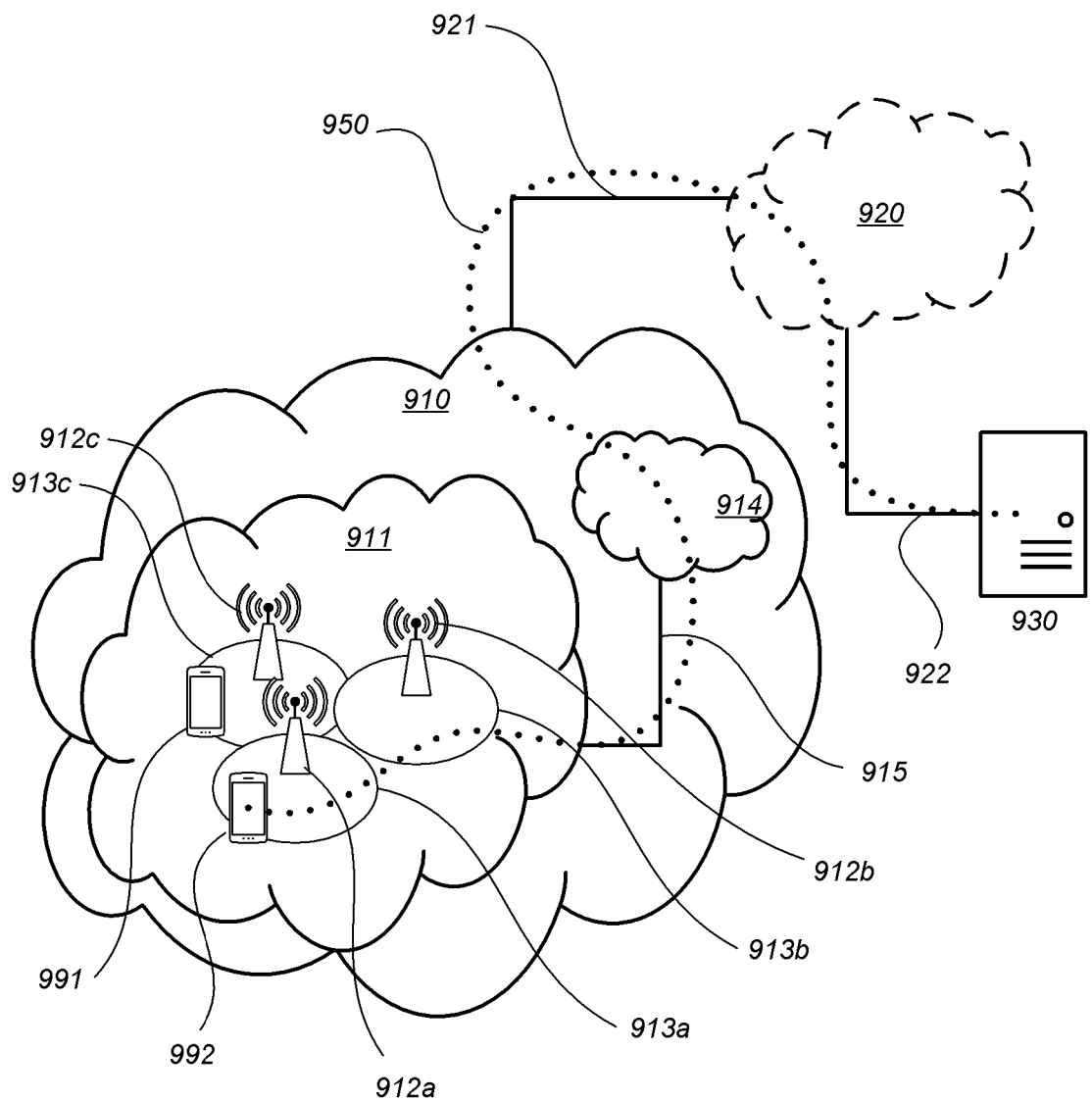
FIG. 9 schematically illustrates a telecommunication network connected via an intermediate network to a host computer.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912*a*, 912*b*, 912*c*, such as NBs, eNBs, gNBs or other types of wireless access points, each defining a corresponding coverage area 913*a*, 913*b*, 913*c*. Each base station 912*a*, 912*b*, 912*c* is connectable to the core network 914 over a wired or wireless connection 915. A first user equipment (UE) 991 located in coverage area 913*c* is configured to wirelessly connect to, or be paged by, the corresponding base station 912*c*. A second UE 992 in coverage area 913*a* is wirelessly connectable to the corresponding base station 912*a*. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 may not or need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
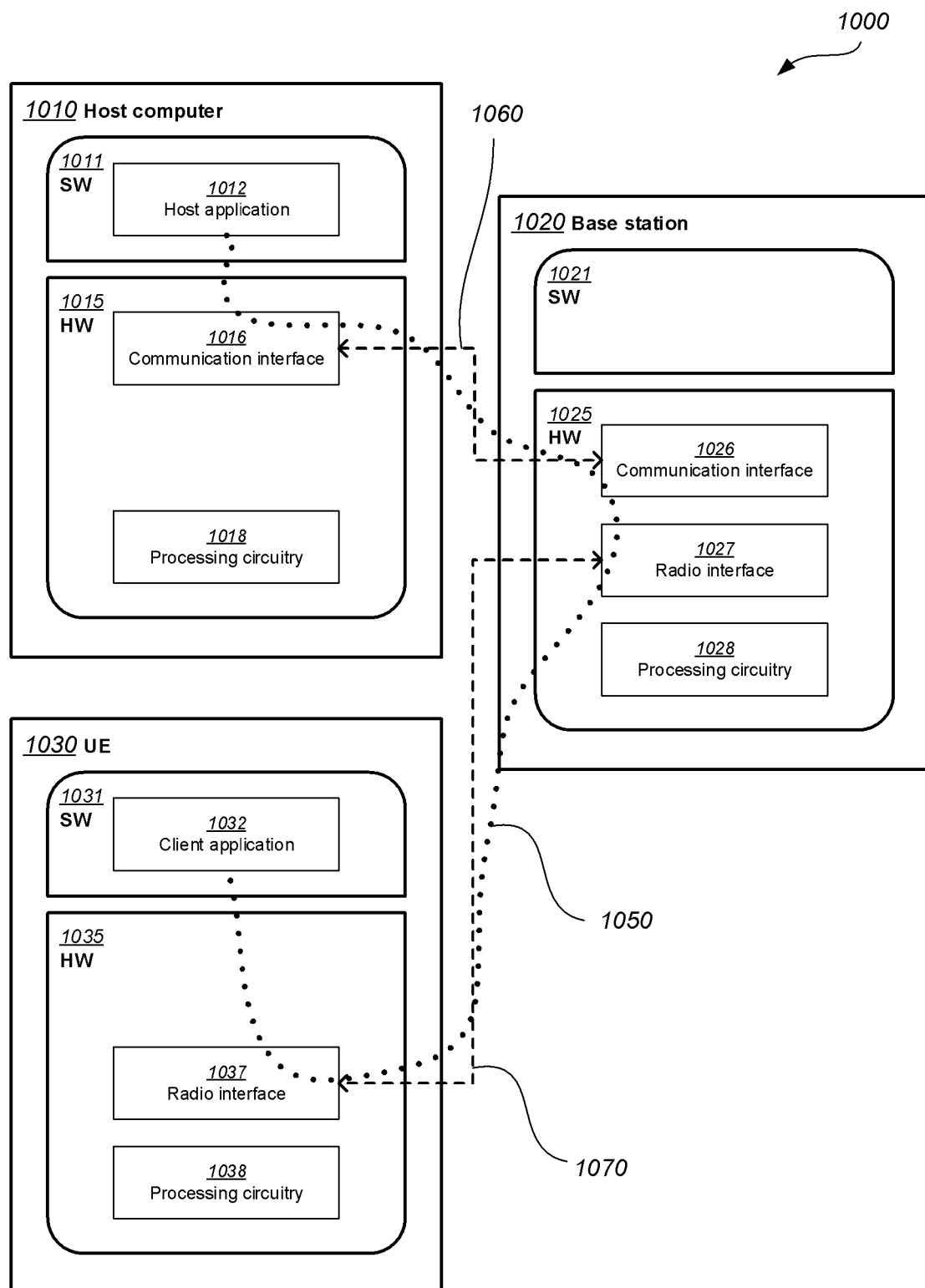
FIG. 10 is a generalized block diagram of a host computer communicating via a base station with a user equipment over a partially wireless connection.

It is noted that the host computer 1010, base station 1020 and UE 1030 illustrated in FIG. 10 may be identical to the host computer 930, one of the base stations 912a, 912b, 912c and one of the UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the use equipment 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the efficiency of data retransmission and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or 'dummy' messages, using the OTT connection 1050 while it monitors propagation times, errors etc.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method at a terminal device in a wireless communication system, the terminal device being capable of Hybrid Automatic Repeat reQuest, HARQ, Acknowledgement/Non-Acknowledgement, ACK/NACK, bundling, comprising:

determining that a number of HARQ ACK/NACK bits to be transmitted is larger than a predetermined capacity; and bundling at least two of the number of HARQ ACK/NACK bits based on a data transmission duration associated with each of the number of HARQ ACK/NACK bits.

2. The method of claim 1, wherein said bundling comprises:

assigning, to each of the number of HARQ ACK/NACK bits, a priority based on the data transmission duration associated with that HARQ ACK/NACK bit; and bundling at least two of the number of HARQ ACK/NACK bits in accordance with the priorities.

3. The method of claim 2, wherein said assigning comprises assigning a higher priority to a first HARQ ACK/NACK bit than to a second HARQ ACK/NACK bit, the first HARQ ACK/NACK bit being associated with a shorter data transmission duration than the second HARQ ACK/NACK bit, and said bundling comprises bundling at least two of the number of HARQ ACK/NACK bits that have the highest priorities.

4. The method of claim 3, wherein the first HARQ ACK/NACK bit is associated with a data transmission in a first numerology having a first Sub-Carrier Spacing, SCS, and the second HARQ ACK/NACK bit is associated with a data transmission in a second numerology having a second SCS smaller than the first SCS.

5. The method of claim 3, wherein the first HARQ ACK/NACK bit is associated with a data transmission in a first slot duration and the second HARQ ACK/NACK bit is associated with a data transmission in a second slot duration longer than the first slot duration.

6. The method of claim 5, wherein the first slot duration is a duration of a mini-slot and the second slot duration is a duration of a slot.

7. The method of claim 2, wherein said bundling further comprises:

determining that a number of the bundled HARQ ACK/NACK bits has reached a predetermined threshold; and assigning, to each bit resulted from the bundling, a lower priority than the priorities of the bundled HARQ ACK/NACK bits before further bundling.

8. The method of claim 1, wherein said bundling comprises time-domain bundling and/or spatial-domain bundling.

9. The method of claim 8, wherein the time-domain bundling is performed only when the number of HARQ ACK/NACK bits to be transmitted is still larger than the predetermined capacity after the spatial-domain bundling.

10. The method of claim 9, wherein the data transmission duration is a duration of Physical Downlink Shared Channel, PDSCH, transmission.

11. A terminal device in a wireless communication system comprising a transceiver, a processor and a memory, the memory comprising instructions executable by the processor whereby the terminal device is operative to perform the method according to claim 1.

12. A non-transitory computer readable storage medium having computer program instructions stored thereon, the computer program instructions, when executed by a processor in a terminal device, causing the terminal device to perform the method according to claim 1.

13. A method at a network device in a wireless communication system, the network device being applicable for Hybrid Automatic Repeat reQuest, HARQ, Acknowledgement/Non-Acknowledgement, ACK/NACK, bundling, comprising:

receiving one or more HARQ ACK/NACK bits from a terminal device;

determining, when a number of HARQ ACK/NACK bits to be received from the terminal device is larger than a predetermined capacity, that at least one of the one or more HARQ ACK/NACK bits is generated by bundling at least two HARQ ACK/NACK bits in accordance with a bundling circumstance dependent on a data transmission duration associated with each of the at least two HARQ ACK/NACK bits; and parsing the one or more HARQ ACK/NACK bits in accordance with the bundling circumstance.

14. The method of claim 13, wherein the bundling circumstance comprises:

a priority is assigned to each of the number of HARQ ACK/NACK bits based on the data transmission duration associated with that HARQ ACK/NACK bit; and at least two of the number of HARQ ACK/NACK bits are bundled in accordance with the priorities.

15. The method of claim 14, wherein the bundling circumstance further comprises:

a higher priority is assigned to a first HARQ ACK/NACK bit than to a second HARQ ACK/NACK bit, the first HARQ ACK/NACK bit being associated with a shorter data transmission duration than the second HARQ ACK/NACK bit, and at least two of the number of HARQ ACK/NACK bits that have the highest priorities are bundled.

16. The method of claim 15, wherein the first HARQ ACK/NACK bit is associated with a data transmission in a first numerology having a first Sub-Carrier Spacing, SCS, and the second HARQ ACK/NACK bit is associated with a data transmission in a second numerology having a second SCS smaller than the first SCS.

17. The method of claim 15, wherein the first HARQ ACK/NACK bit is associated with a data transmission in a first slot duration and the second HARQ ACK/NACK bit is associated with a data transmission in a second slot duration longer than the first slot duration.

18. The method of claim 14, wherein the bundling circumstance further comprises:

when a number of the bundled HARQ ACK/NACK bits has reached a predetermined threshold, a lower priority than the priorities of the bundled HARQ ACK/NACK bits is assigned to each bit resulted from the bundling, before further bundling.

19. A network device comprising a transceiver, a processor and a memory, the memory comprising instructions executable by the processor whereby the network device is operative to perform the method according to claim 13.

20. A non-transitory computer readable storage medium having computer program instructions stored thereon, the computer program instructions, when executed by a processor in a network device, causing the network device to perform the method according to claim 13.

* * * * *